April 20, 1965
F. B. RECKER
3,179,450
COUPLING
Filed Aug. 24, 1961
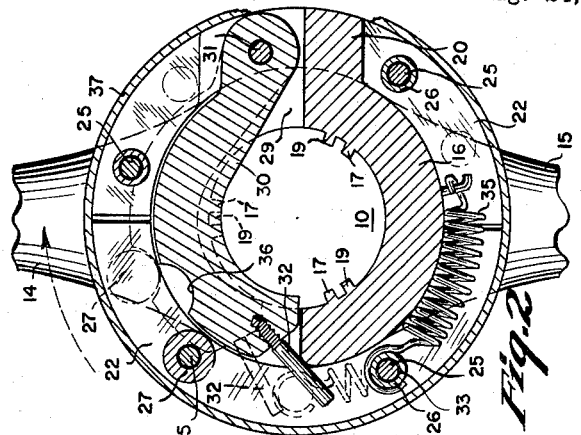
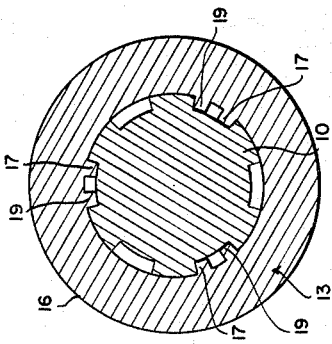
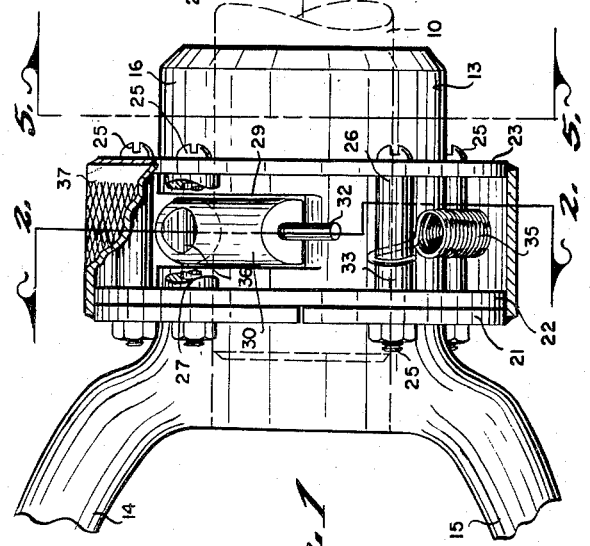
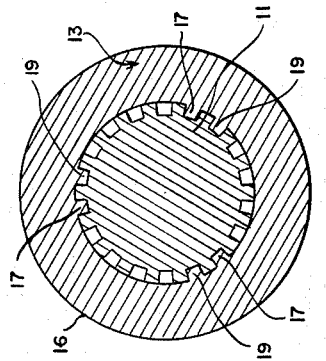
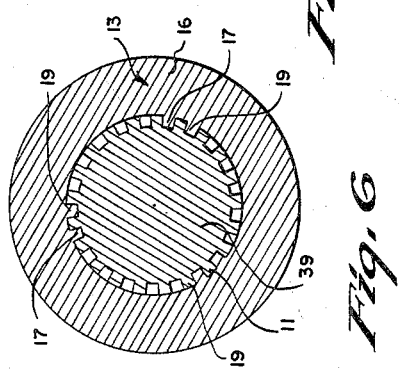
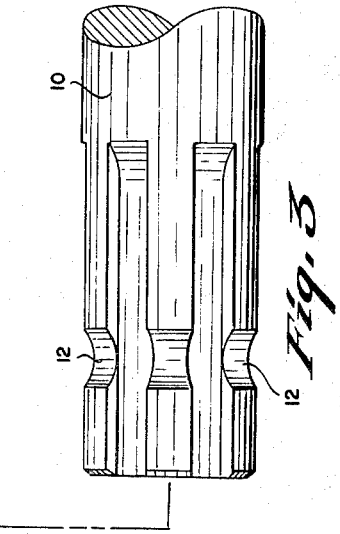
INVENTOR.
FLORIAN B. RECKER
BY
Talbert Dick & Barley
ATTORNEYS
WITNESS
NORMAN G. TRAVISS

United States Patent Office

3,179,450
Patented Apr. 20, 1965

3,179,450
COUPLING
Florian B. Recker, Hopkinton, Iowa
Filed Aug. 24, 1961, Ser. No. 133,669
5 Claims. (Cl. 287—53)

This invention relates to a coupling means and more particularly to a lockable quick release universal coupling for use between the power takeoff of a farm tractor and a mechanized implement.

Substantially all tractors have a power take-off splined shaft with a circumferential groove. The implement or device to receive the power has an internally splined sleeve or collar slidably mounted around the power take-off shaft. Obviously two serious problems are encountered. Firstly, some means must be provided to prevent the accidental detachment of the sleeve or collar from the power take-off shaft. Herebefore the usual means has been a bolt, set screw or like, and which requires time and tools to effect the detachment or securing phases. Secondly, different tractor take-off shafts have differences in the number of splines. Some such shafts have six splines, while others have more splines, and perhaps one of the most common has twenty-one splines. It is for this reason that a power receiving collar or like of a given implement will not fit more than one type of tractor take-off shaft.

Therefore, one of the principal objects of my invention is to provide a coupling that may be easily and quickly and without tools detached from or attached to the splined shaft of the power take-off of a tractor.

A further object of this invention is to provide a power receiving socket for use on the power take-off shafts of tractors that will successfully fit power take-off shafts having different numbers of splines.

A still further object of this invention is to provide a coupling that may be manipulated by the use of only one hand.

Still further objects of my invention are to provide a power coupling that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a side view of my power coupling with sections cut away to more fully illustrate its construction.

FIG. 2 is a cross sectional view of the device taken on line 2—2 of FIG. 1.

FIG. 3 is a top plan view of a power take-off shaft having six splines.

FIG. 4 is a cross sectional view of my coupling engaging a power take-off shaft having twenty-four splines.

FIG. 5 is a cross sectional view of my device on a six splined power take-off shaft and is taken on line 5—5 of FIG. 1, and FIG. 6 shows the device on a twenty-one splined power take-off shaft.

In these drawings I have used the numeral 10 to generally designate an ordinary tractor power take-off shaft having six evenly spaced apart splines. The numeral 11 designates an ordinary tractor power take-off shaft having twenty-four evenly spaced apart splines.

All such power take-off shafts have a circumferential groove 12 some distance from their free ends as shown in FIG. 3.

My cylindrical power receiving unit is generally designated by the numeral 13 and the two rearwardly extending arm portions 14 and 15 may extend to and become a part of a universal joint for connecting the same to the power receiving shaft of the implement or like equipment. The two arm portions 14 and 15 are rigidly connected to a collar, sleeve 13, cylinder or like 16. On the inner side of this member 16, I have three equally spaced apart pair of splines. The numerals 17 and 19 designate the two spaced apart splines that go to make up each pair of splines, as shown in FIG. 2. Each pair of splines 17 and 19 have collectively a combined lateral meaurement slightly less than that of the distance between any two of the splines of a six splined power take-off shaft 10, as shown in FIG. 5. Inasmuch as there are three evenly spaced apart pairs of splines 17 and 19, my unit will slide onto a splined power take-off shaft 11, having eighteen, twenty-one, or twenty-four or like splines. By such a construction, my unit will therefore successfully slide into power take-off shafts having a number of splines divisible by three. This means that my unit is substantially universal in successfully fitting most all power take-off shafts now found on tractors.

The next feature of my device is the simple but positive mechanism for locking it into a power take-off shaft against accidental detachment. On the outer side of the member 16 is a block stop 20. To the rear of this block stop 20 are two rings 21 and 22. Each of these rings is of two split parts so that they may be rotatably placed around the rear portion of the member 16. The numeral 23 designates a ring rotatably mounted around the forward end portion of the member 16 and forward of the block stop 20. These rings 21, 22, and 23 are rigidly connected together by bolt means 25, with each bolt means having a spacing tube 26 between the plate 22 and 23 as shown in FIG. 1 and FIG. 2. Around one of these tubes 26 is a cylindrical roller 27. The rotation of the ring assembly is limited in rotation counter-clockwise, as viewed in FIG. 2, by one of the bolt means and spacing tubes coming into contact with the block stop. In the side of the member 16 and transversely of its longitudinal length I have a slot opening 29 communicating with the power take-off shaft and its groove 12. The numeral 30 designates a jaw member movable in the slot 29 and having one end hinged on a pin 31 of the block stop as shown in FIG. 2. The substantial length of the jaw member is curved both as to its inner side and its outer side. Its curved inner side, when it is moved toward the power take-off shaft will move into and engage the power take-off shaft groove 12, thus detachably preventing the slidable removal of the unit from the power take-off shaft. Several means may be used to lower or raise this jaw by the rotation of the ring assembly. In the drawings I provide a pin lever 32 that extends forwardly and outwardly from the free end of the jaw as shown in FIG. 1. When the ring assembly is manually rotated clockwise, as viewed in FIG. 2, the bolt means and its spacing tube and which I have specifically indicated by the numeral 33 will ride under this angularly extending pin 32 and thereby raise the jaw 30 to the dotted line position of FIG. 2, out of the power shaft groove 12, at which time my unit may be slid from the power take-off shaft. To place my unit into a take-off shaft the ring assembly is rotated clockwise, raising the jaw so that the unit may be slid onto the splined take-off shaft. After the unit is placed on the power take-off shaft, the ring assembly is released and when it rotates counter-clockwise, the bolt means 33 will clear the pin 32 and the jaw will automatically move inwardly and engage the peripheral notch 12 of the power take-off shaft. This automatic return of the ring assembly and jaw is actuated by a coil spring 35 having one end secured to the bolt means 33 and its other end secured to the cylinder or collar 16, as shown in FIG. 2 for yieldingly rotating and biasing the ring assembly to the normal position shown in full lines in FIG. 2. The jaw, of course, must be maintained in an effective inner position of movement, i.e., in the groove 12 to successfully hold the unit from accidental detachment from the power take-off shaft. This is accomplished by the roller 27, which when the ring assembly is in its normal, locked position, presses against the curved top of the jaw thereby forcing and holding the jaw inwardly. This roller must, however, in some way clear the jaw when the ring assembly is rotated to bring the bolt means 33 under and to raise the pin 32. I accomplish this by providing a depression 36 in the top of the jaw 30, so that as the ring assembly is rotated clockwise against the yielding action of the coil spring, the roller 27 will reach the vicinity of the depression 36, thereby permitting the raising of the jaw from contact with the groove 12.

A cylindrical housing is secured around the ring assembly and its outer surface may be knurled or like to make for easy manual gripping. This housing may be secured to the outer peripheries of the rings by any suitable means and, if desired, may be detachable or permanently affixed.

As before indicated, my collar member will fit power take-off shafts having different numbers of splines. As an illustration, FIG. 6 shows a power take-off splined shaft 39 having twenty-one splines. Perhaps the two most popular type power take-off splines is the six splined shaft shown in FIG. 5 and the twenty-one splined shaft shown in FIG. 6.

Some changes may be made in the construction and arrangement of my coupling without departing from the real spirit and purpose of my invention, and it is my intention to cover by my claims, any modified forms of structure or use of mechanical equivalents which may be reasonably included within their scope.

I claim:

1. In combination, a stub power take-off splined shaft having a peripheral groove, a cylindrical member having internal splines, and slidably detachably embracing said power take-off shaft, a slot in said cylindrical member, an arcular bar having one end hinged in said slot and capable of being moved to a position of engagement with the peripheral groove of said power take-off shaft, a ring assembly rotatably mounted around said cylindrical member, an outwardly and forwardly extending pin on the free end of said arcular bar, a member on said ring assembly capable of engaging the under side of said pin and raising said arcular bar when said ring assembly is rotated in one direction, and a member on said ring assembly capable of assuming a locking position over said arcular bar when said ring assembly is rotated in the opposite direction.

2. In combination, a stub power take-off splined shaft having a peripheral groove, a cylindrical member having internal splines, and slidably detachably embracing said power take-off shaft, a slot in said cylindrical member, an arcular bar having one end hinged in said slot and capable of being moved to a position of engagement with the peripheral groove of said power take-off shaft, a ring assembly rotatably mounted around said cylindrical member, an outwardly and forwardly extending pin on the free end of said arcular bar, a member on said ring assembly capable of engaging the under side of said pin and raising said arcular bar when said ring assembly is rotated in one direction, and a roller member on said ring assembly capable of assuming a locking position over said arcular bar when said ring assembly is rotated in the opposite direction.

3. In combination, a stub power take-off splined shaft having a peripheral groove, a cylindrical member having internal splines, and slidably detachably embracing said power take-off shaft, a slot in said cylindrical member, an arcular bar having one end hinged in said slot and capable of being moved to a position of engagement with the peripheral groove of said power take-off shaft, a ring assembly rotatably mounted around said cylindrical member, an outwardly and forwardly extending pin on the free end of said arcular bar, a member on said ring assembly capable of engaging the under side of said pin and raising said arcular bar when said ring assembly is rotated in one direction, a roller member on said ring assembly capable of assuming a locking position over said arcular bar when said ring assembly is rotated in the opposite direction, and a receiving notch in said arcular bar for said roller member when said arcular bar is raised.

4. In a coupling, a circular shaft having at least a plurality of external splines of equal arcuate length, and with a first arcuate space therebetween of an arcuate length equal to the arcuate length of one of said splines, a cylindrical member having at least a pair of internal splines, said internal splines being of equal arcuate length and having an arcuate space therebetween of a length equal to the arcuate length of one of said internal splines, the overall arcuate length of said pair of internal splines and the space therebetween being slightly less than said first arcuate space.

5. In combination, an externally splined power take-off shaft having a circular groove extending transversely to its longitudinal axis about its outer periphery and intersecting the splines thereof, a cylindrical member mounted on said shaft and having internal splines which embrace and mate with the splines of said shaft, a transverse slot in said cylindrical member and intersecting the inner periphery thereof, an arcuate rigid key pivotally secured by one of its ends to said cylindrical member and lying within said slot, said key member having an inner elongated arcuate portion of such length and with a radius equal to that of said circular groove that it engages an elongated segment of the peripherical surface of said groove and intersects at least a plurality of shaft splines, and key actuating means rotatably mounted around said cylindrical member and engageable with the key member in either direction of rotation thereof to pivot the key member into and out of engagement with said groove.

References Cited by the Examiner

UNITED STATES PATENTS

| | | | |
|---|---|---|---|
| 691,759 | 1/02 | George et al. | 287—2 |
| 1,634,422 | 7/27 | Holmes | 279—107 X |
| 2,012,280 | 8/35 | Johansen | 279—35 |
| 2,374,244 | 4/45 | Standish | 287—53 X |
| 2,448,278 | 8/48 | Ronning | 287—52 |
| 2,691,899 | 10/54 | Brown. | |
| 2,885,231 | 5/59 | Smith | 287—53 |
| 2,926,034 | 2/60 | Weaver | 287—53 |
| 2,948,559 | 8/60 | Recker. | |
| 3,100,661 | 8/63 | Knight | 287—119 |

FOREIGN PATENTS 430,713   6/35   Great Britain.

CARL W. TOMLIN, Primary Examiner.

WALTER A. SCHEEL, Examiner.